(12) United States Patent
Rozman et al.

(10) Patent No.: US 8,378,641 B2
(45) Date of Patent: Feb. 19, 2013

(54) ELECTRIC POWER GENERATING SYSTEM WITH BOOST CONVERTER/SYNCHRONOUS ACTIVE FILTER

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 247 days.

(21) Appl. No.: 12/834,371

(22) Filed: Jul. 12, 2010

(65) Prior Publication Data
US 2012/0007428 A1   Jan. 12, 2012

(51) Int. Cl.
H02P 11/04 (2006.01)
H02P 9/00 (2006.01)

(52) U.S. Cl. .......................................... 322/24; 322/59

(58) Field of Classification Search ................. 322/24, 322/44, 59
See application file for complete search history.

(56) References Cited

U.S. PATENT DOCUMENTS

| | | | |
|---|---|---|---|
| 5,218,520 A | 6/1993 | Rozman et al. | |
| 5,325,042 A * | 6/1994 | Murugan | 322/10 |
| 5,581,168 A * | 12/1996 | Rozman et al. | 318/723 |
| 5,594,322 A * | 1/1997 | Rozman et al. | 322/10 |
| 6,870,350 B2 | 3/2005 | Garrigan et al. | |
| 7,327,113 B2 * | 2/2008 | Steigerwald et al. | 318/599 |
| 7,687,929 B2 * | 3/2010 | Fattal | 290/40 C |
| 2002/0041502 A1 * | 4/2002 | Ulinksi et al. | 363/37 |
| 2007/0216343 A1 * | 9/2007 | Rozman et al. | 318/811 |
| 2007/0268004 A1 * | 11/2007 | Rozman et al. | 322/37 |
| 2008/0111420 A1 | 5/2008 | Anghel et al. | |
| 2009/0021080 A1 * | 1/2009 | Loucks et al. | 307/68 |
| 2010/0080030 A1 * | 4/2010 | Wiegman et al. | 363/131 |

* cited by examiner

*Primary Examiner* — Tulsidas C Patel
*Assistant Examiner* — S. Mikailoff
(74) *Attorney, Agent, or Firm* — Cantor Colburn LLP (57) ABSTRACT

A method of startup of an electric start electrical power generating system (EPGS) is provided. The EPGS includes a generator configured to power a direct current (DC) load via a DC bus. The method includes: disconnecting the DC load from the DC bus; connecting a battery to a boost converter, the boost converter being connected to the generator; powering the generator using the battery via the boost converter; when the generator reaches a minimum speed: disconnecting the battery from the boost converter; deactivating the boost converter; and activating a synchronous active filter, the synchronous active filter being connected to the DC bus; bringing up a voltage on the DC bus by the generator; and when the voltage on the DC bus reaches a predetermined level, connecting the DC load to the DC bus.

17 Claims, 6 Drawing Sheets

ELECTRIC POWER GENERATING SYSTEM WITH BOOST CONVERTER/SYNCHRONOUS ACTIVE FILTER

FIELD OF INVENTION

The subject matter disclosed herein relates generally to the field of electrical power generating systems.

DESCRIPTION OF RELATED ART

Vehicles, such as military hybrid vehicles or aircraft, may include electric power generating systems (EPGS) that utilize a synchronous generator to power a DC load in the vehicle. The synchronous generator may comprise a permanent magnet (PM) or wound field (WF) generator. A voltage ripple on the direct current (DC) bus exists after rectification of the generator output. To reduce the DC bus voltage ripple to levels that are appropriate to meet specification requirements for the DC load, a relatively large DC bus capacitor may be required in the EPGS, adding weight and size to the EPGS. The DC bus capacitor is sized based on the ripple frequency, and may need to be significantly increased when the generator operates at a relatively low speed. Another approach to reduce DC bus voltage ripple includes increasing the frequency bandwidth of an active rectifier that rectifies the generator output; however, this approach may increase system noise.

BRIEF SUMMARY

According to one aspect of the invention, a method of startup of an electric start electrical power generating system (EPGS), the EPGS comprising a generator configured to power a direct current (DC) load via a DC bus includes: disconnecting the DC load from the DC bus; connecting a battery to a boost converter, the boost converter being connected to the generator; powering the generator using the battery via the boost converter; when the generator reaches a minimum speed, disconnecting the battery from the boost converter; deactivating the boost converter; and activating a synchronous active filter, the synchronous active filter being connected to the DC bus; bringing up a voltage on the DC bus by the generator; and when the voltage on the DC bus reaches a predetermined level, connecting the DC load to the DC bus.

According to another aspect of the invention, an electrical power generating system (EPGS) includes a generator connected to a direct current (DC) bus; a boost converter connected to the generator; a battery, the battery configured to power the generator during startup via the boost converter, wherein when the generator reaches a minimum speed, the battery is configured to be disconnected from the boost converter; and a synchronous active filter (SAF), the SAF being connected to the DC bus; wherein when a voltage on the DC bus is brought up to a predetermined level by the generator, the generator is configured to power a DC load, the boost converter is configured to be deactivated, and the SAF is configured to be activated.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for an EPGS with a boost converter and a synchronous active filter (SAF) are provided, with exemplary embodiments being discussed below in detail. A boost converter is a DC-DC power converter that has an output voltage that is greater than its input voltage. The boost converter may be connected to a battery that powers a generator via the boost converter and start inverter during startup. The generator is operated as a motor in the startup to convert electrical power supplied by a start inverter into motive power, which is provided to the prime mover to bring it up to self-sustaining speed. In the case of a WF generator, AC power is provided to the armature windings of the main portion of the WF generator and to AC exciter field windings, so that the motive power may be developed. This may be accomplished by using two separate inverters. During generate mode, the DC bus is connected to a DC load, and the power converter is reconfigured as an SAF. The SAF acts to reduce DC bus voltage ripple on the DC bus during generate mode. Reduction in DC bus voltage ripple allows for reduction in size of the DC bus capacitor. In some embodiments, the boost converter may comprise a buck/boost converter, which may output a voltage that is either higher or lower than the input voltage. In some embodiments, the boost converter and the SAF may be embodied in a reconfigurable power converter.

Figure 1:
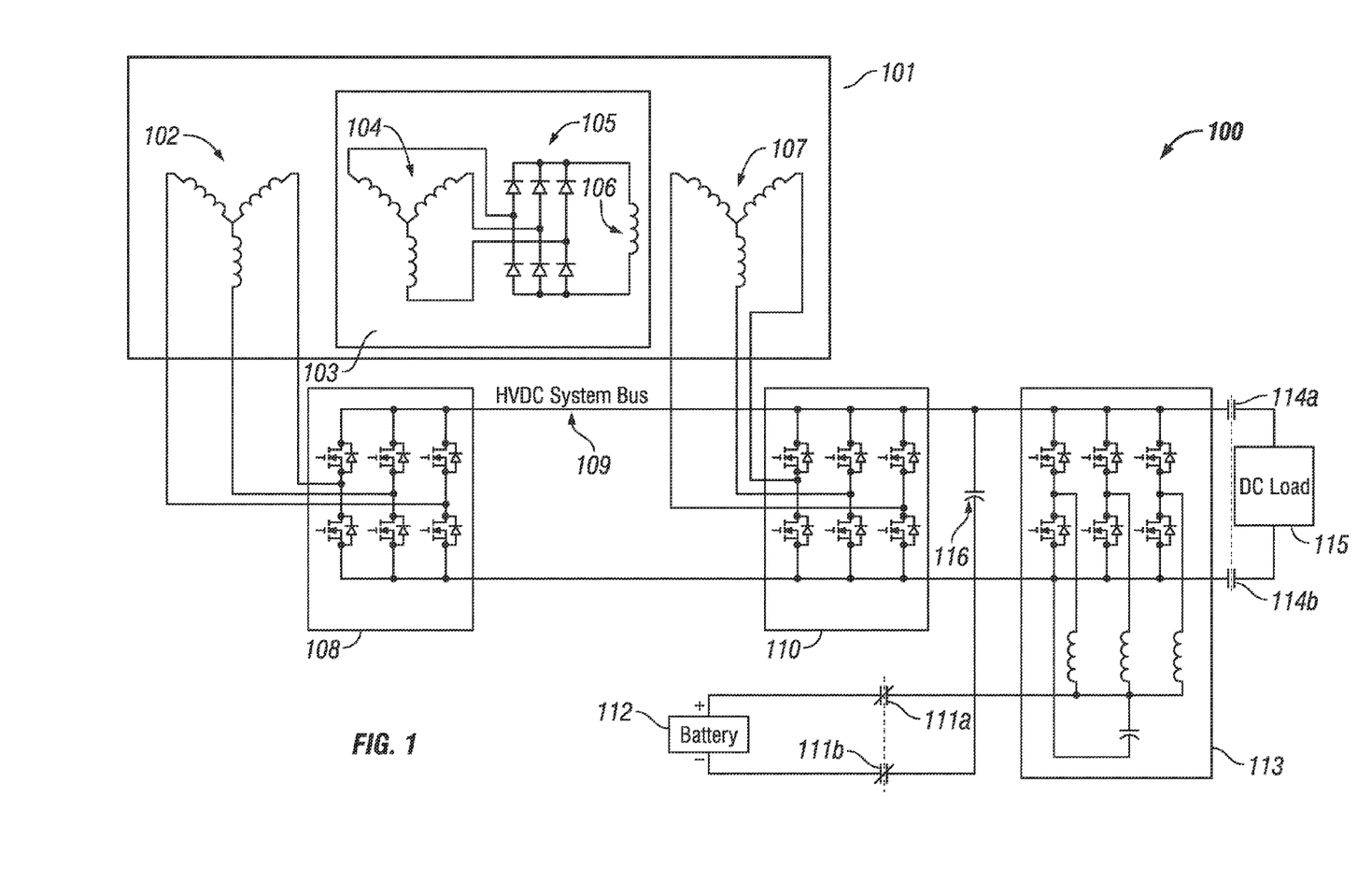
FIG. 1 illustrates an embodiment of an EPGS with a WF generator comprising a reconfigurable power converter configured as a boost converter during start mode.

FIG. 1 illustrates an embodiment of an electric start EPGS 100 comprising a reconfigurable power converter 113 and a WF generator 101. Reconfigurable power converter 113 may function as a boost converter during startup, and as an SAF during normal operation. The WF synchronous generator 101 generates AC power through the rotation of rotating portion 103, which comprises an exciter armature winding 104, rotating rectifier 105, and main field winding 106. Rotating portion 103 rotates in proximity to exciter field winding 102 and main armature winding 107. Exciter field winding 102 is connected to exciter inverter 108, and main armature winding 107 is connected to start inverter 110. Exciter inverter 108 and start inverter 110 are both on high voltage DC (HVDC) bus 109. Battery 112 is connected to reconfigurable power converter 113 via switches 111a-b. DC bus capacitor 116 is connected across reconfigurable power converter 113, and DC load 115 is connected across reconfigurable power converter 113 via switches 114a-b.

Reconfigurable power converter 113 is configured as a three-phase interleave boost converter during startup. During startup, the DC load 115 is disconnected from the HVDC bus 109 by opening switches 114a-b, and switches 111a-b are closed, connecting battery 112 to the reconfigurable power converter 113. Then the reconfigurable power converter 113 increases the voltage on the HVDC bus 109 using power from battery 112, increasing the voltage to exciter inverter 108 and start inverter 110. Exciter inverter 108 provides AC constant frequency (about 400 Hz in some embodiments) power from HVDC system bus 109 to the three-phase exciter field windings 102, and start inverter 110 provides variable voltage variable frequency (VVVF) power from HVDC bus 109 to the main armature windings 107. Then, upon achieving generate mode speed (about 800 rpm in some embodiments) by WF synchronous generator 101, the battery 112 is disconnected from the reconfigurable power converter 113 by opening switches 111a-b, and the reconfigurable power converter 113 is reconfigured as an SAF for normal operation of EPGS 100. Also, after startup is completed, the exciter inverter 108 is reconfigured as DC exciter by disabling one of the phase legs, and all switches comprising start inverter 110 are turned-off, reconfiguring start inverter 110 into a 6-pulse rectifier.

Figure 2:
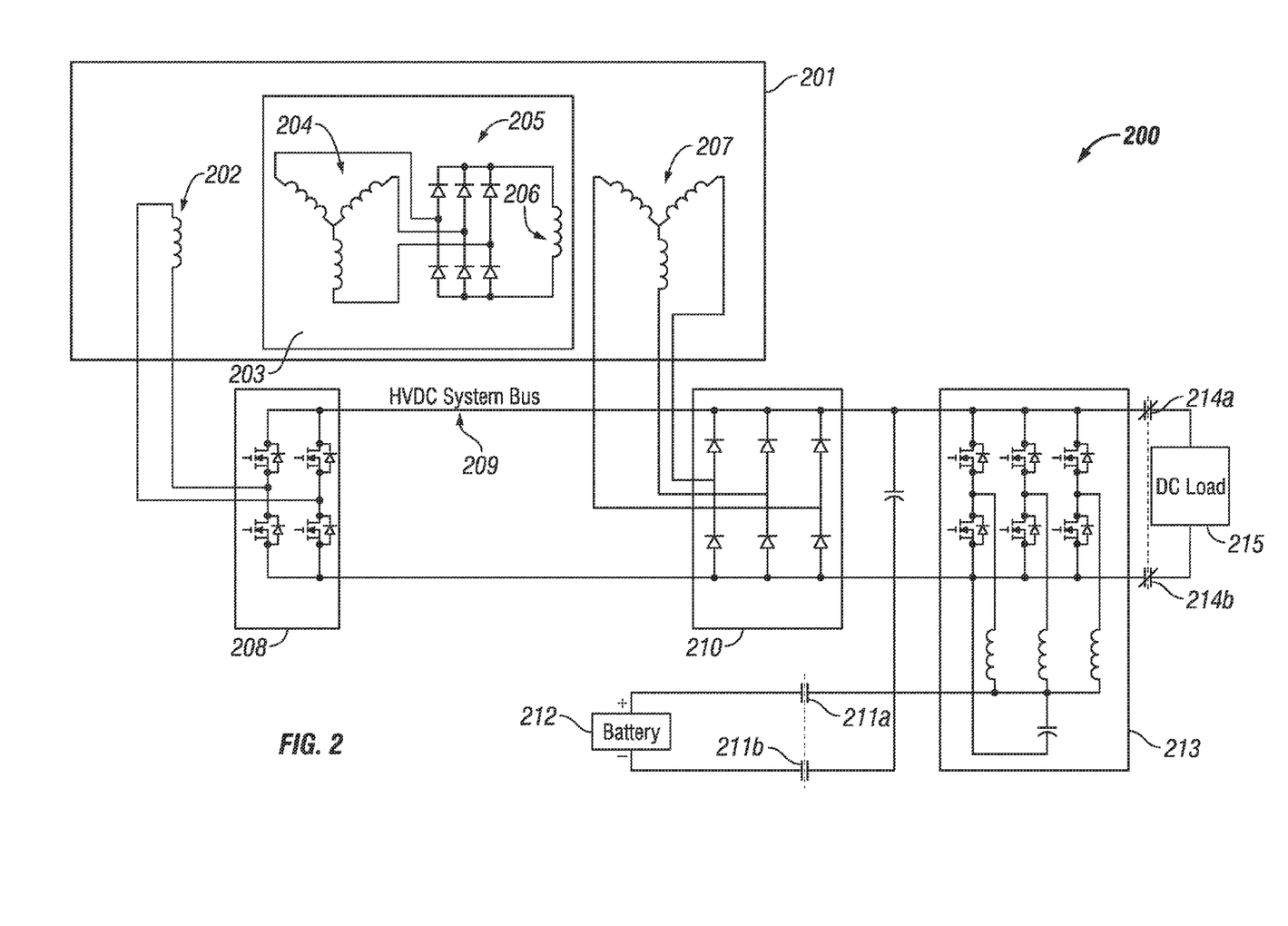
FIG. 2 illustrates an embodiment of the EPGS with a WF generator comprising a reconfigurable power converter configured as a synchronous active filter during generate mode.

FIG. 2 illustrates an embodiment of an EPGS 200 comprising a WF generator 201 and a reconfigurable power converter 213 during generate mode. Reconfigurable power converter 213 may function as a boost converter during startup and as an SAF during normal operation. Start mode is not supported in the embodiment of FIG. 2. The EPGS 200 of FIG. 2 also includes a 6-pulse rectifier 210 and DC exciter inverter 208. The WF synchronous generator 201 generates AC power through the rotation of rotating portion 203, which comprises an exciter armature winding 204, rotating rectifier 205, and main field winding 206. Rotating portion 203 rotates in proximity to exciter field winding 202 and main armature winding 207. Exciter field winding 202 is connected to DC exciter inverter 208, and main armature winding 207 is connected to rectifier 210. DC exciter inverter 208 and rectifier 210 are both on HVDC bus 209.

To enable power generation, the battery 212 provides a DC voltage to the DC exciter inverter 208 that controls the DC exciter current in response to the voltage on DC bus 209. During this time, the DC load 215 is disconnected from the DC bus 209 by opening switches 214a-b, and switches 211a-b are closed. When the DC bus voltage exceeds the battery voltage, the battery 212 is disconnected from the DC bus 209 by opening switches 211a-b. The DC exciter inverter 208 gradually increases DC exciter field current to provide soft start of the voltage on HVDC bus 209 to its specified value (about 270 Vdc-800 Vdc in some embodiments). When the voltage on HVDC bus 209 reaches the specified value, a power quality monitor (not depicted) may detect that DC power at no-load on HVDC bus 209 is within specification levels for DC load 215. At this point, reconfigurable power converter 213 is reconfigured from a boost converter to an SAF, and the DC load 215 is connected to the HVDC bus 209 by closing switches 214a-b. DC exciter inverter 208 controls the DC exciter current to achieve gradual increase of the voltage on DC bus 209, which is commonly referred as a soft start of the DC bus voltage. The DC exciter inverter 208 powers exciter field winding 202. Rectifier 210 may comprise a 6-pulse rectifier in some embodiments. Reconfigurable power converter 213 acts to reduce the ripple on HVDC bus 209 during generate mode by acting as an SAF.

Figure 3:
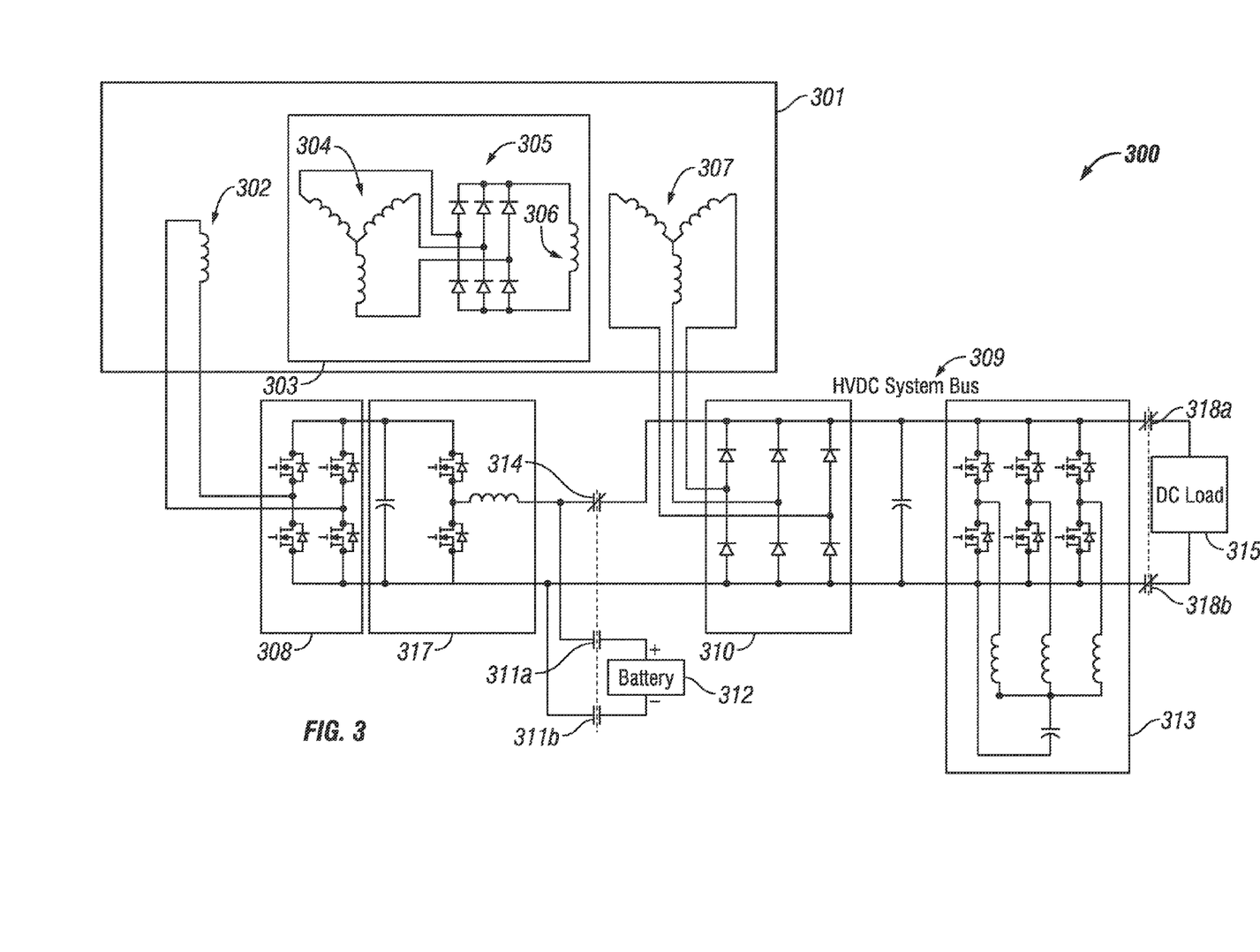
FIG. 3 illustrates an embodiment of an EPGS with a WF generator comprising a buck-boost converter and a synchronous active filter.

FIG. 3 illustrates another embodiment of an EPGS 300 comprising a buck/boost converter and an SAF during generate mode. Start mode is not supported in the embodiment shown in FIG. 3. EPGS 300 comprises a WF synchronous generator 301 comprising a rotating portion 303, which comprises an exciter armature winding 304, rotating rectifier 305, and main field winding 306, exciter field winding 302, main armature winding 307. Exciter field winding 302 is connected to DC exciter 308, and main field winding 306 is connected to rectifier 310. Battery 312 is connected to exciter inverter 308 via buck/boost converter 317 and switches 311a-b. DC load 315 connected to HVDC bus 309 via switches 318a-b. At low generator speed, the battery 312 is connected to buck/boost converter 317 by closing switches 311a-b, switch 314 is opened, and switches 318a-b are opened to disconnect DC load 315 from HVDC bus 309. The buck/boost converter 317 raises the voltage on HVDC bus 309 available to exciter inverter 308 to accommodate for any residual load on the bus, or, in the case when the voltage on HVDC bus 309 is relatively high (above 200 Vdc), the buck/boost converter 317 may reduce the voltage available to exciter inverter 308 to a level appropriate to avoid exciter inverter operation with a very low duty cycle. When generate mode speed (about 800 rpm in some embodiments) is achieved by WF synchronous generator 301, battery 312 is disconnected by opening switches 311a-b, and the SAF 313 is enabled to reduce the ripple on HVDC bus 309 during generate mode. The DC exciter 308 gradually increases exciter field current to achieve soft start of the voltage on HVDC bus 309 to its specified value (about 270 Vdc-800 Vdc in some embodiments). Then, a power quality monitor may detect that DC power at no-load on HVDC bus 309 is within the specification levels for DC load 315. At this point, the DC load 315 is connected to the bus by closing switches 318a-b, and switch 314 is also closed. The voltage applied to the DC exciter inverter 308 is controlled by operating the buck/boost converter 313 in buck mode during operation.

Figure 4:
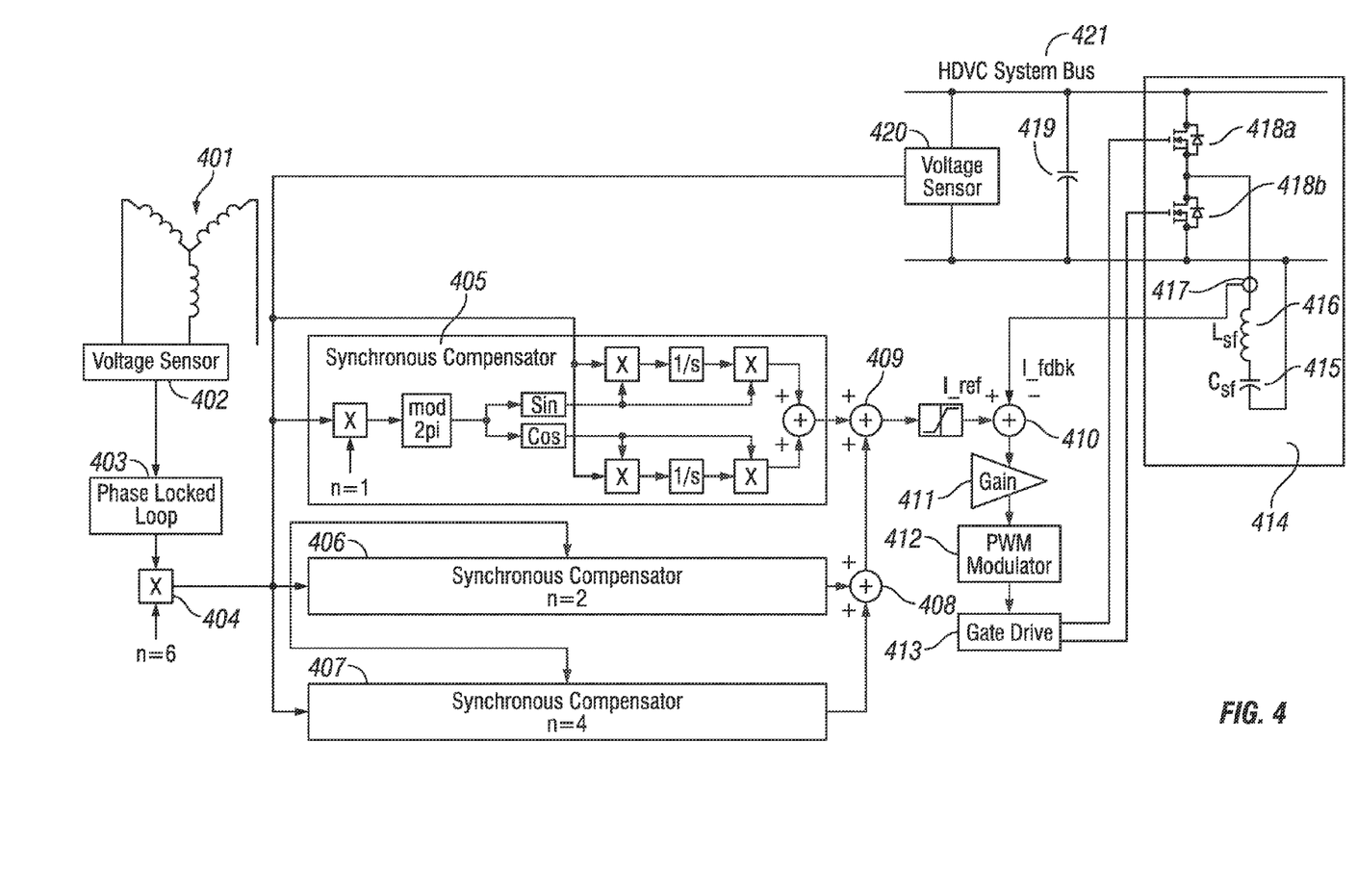
FIG. 4 illustrates a detailed view of an embodiment of a synchronous active filter.

FIG. 4 illustrates a detailed view of an embodiment of a synchronous active filter (SAF) 414 for an EPGS in generate mode, which may comprise either of SAFs embodied in reconfigurable power converters 113 or 213, or SAF 313. SAF 414 may exhibit a single phase topology. Synchronous active filter 414 comprises capacitor 415, inductor 416, and switches 418a-b connected in series. The gate drive 413 of switches 418a-b is controlled using data from current sensor 417. Main armature winding 401 (which may comprise any of main armature windings 107, 207, or 307) and voltage sensor 402 are connected via a phase locked loop 403 to the multiplier 404. The multiplier 404 provides synchronization frequency to the synchronous compensators 405, 406, and 407 by multiplying signal from the phase locked loop 403 by 6. This synchronization frequency is the dominant frequency of the voltage ripple on DC bus after 6-pulse rectification of the generator voltage. Synchronous compensators also receive input from voltage sensor 420, which is connected across HVDC bus 421 and DC bus capacitor 419 (which may comprise any of HVDC buses 209 or 309, and DC bus capacitors 216 or 316, respectively). The outputs of synchronous compensators 406 and 407 are added by adder 408, and the output of adder 408 is added to the output of synchronous compensator 405 by adder 409. The output of adder 409 after a limit function becomes a current reference (I_ref) to the current loop that comprises current feedback signal (I fdbk) from the current sensor 417, error summer 410 and amplifier 411. Pulse width modulator 412 converts controlled voltage out the amplifier 411 output to modulate SAF 414 power switches 418a and 418b via gate drive 413. Synchronous compensator 405 is tuned to cancel or reduce the dominant frequency of the DC bus voltage ripple, while synchronous compensators 406 and 407 are tuned to cancel or reduce the $2^{nd}$ and $4^{th}$ harmonics of the DC bus voltage ripple respectively. Synchronous active filter 414 modulates the DC bus in response to the current reference I_ref to cancel or reduce the voltage ripple on DC bus which is the product of 6-pulse rectification of the generator voltages.

Figure 5:
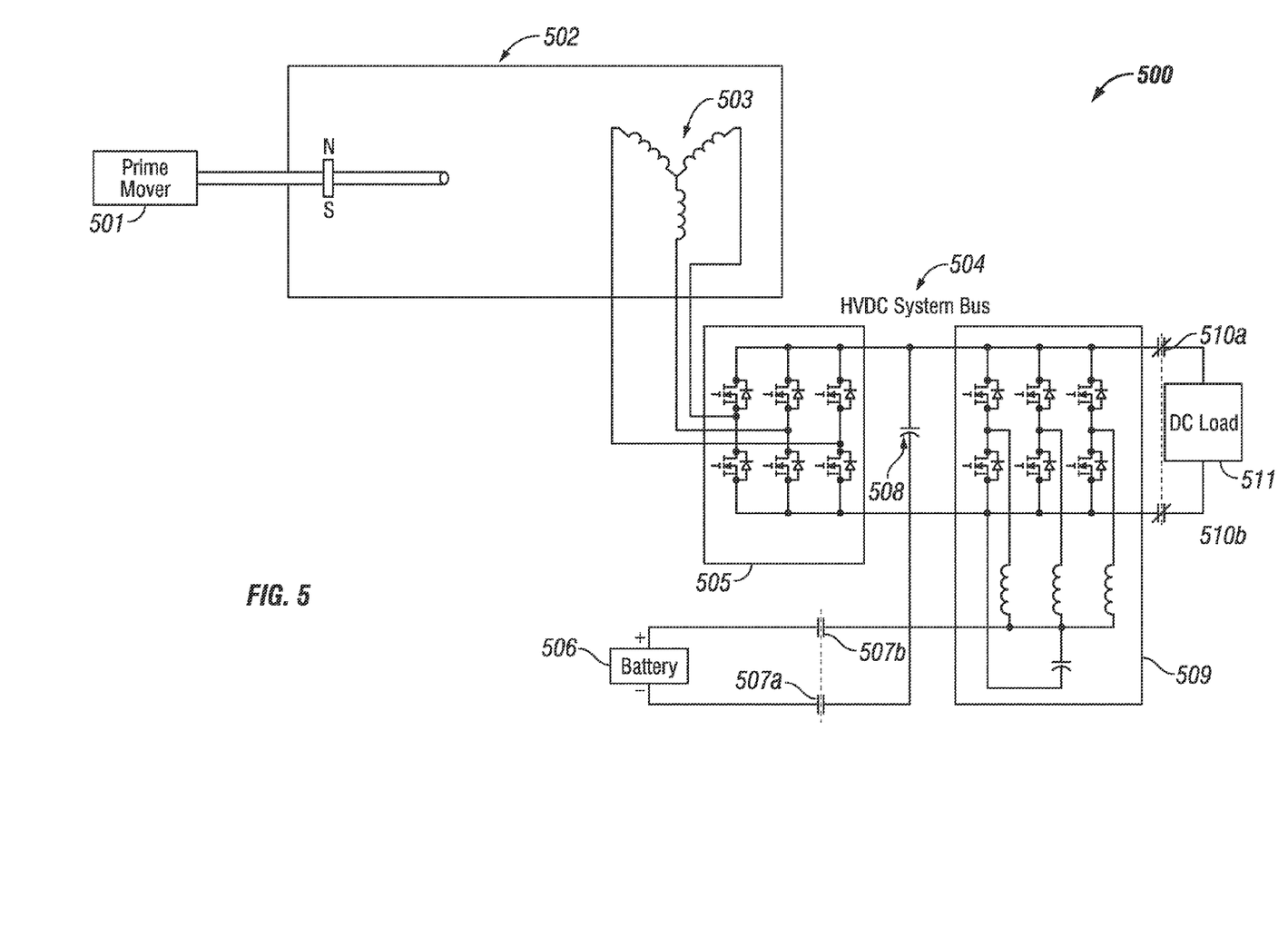
FIG. 5 illustrates an embodiment of an EPGS with a PM generator comprising a reconfigurable power converter.

FIG. 5 illustrates an embodiment of an EPGS 500 with a permanent magnet (PM) generator 502, start inverter/active rectifier 505 and reconfigurable power converter 509. Reconfigurable power converter 509 may function as a boost converter during startup, and as an SAF during normal operation. PM generator 502 is powered by prime mover 501, which maybe any portion of a vehicle that moves in a manner appropriate to be harnessed for power generation. During startup, reconfigurable power converter 509 is configured as a boost converter, and start inverter/active rectifier 505 acts as a start inverter. During startup, battery 506 is connected to boost converter 505 by closing switches 507a-b, and DC load 511 is disconnected from HVDC bus 504 by opening switches 510a-b. Battery 506 then powers armature winding 503 during startup via reconfigurable power converter 509 and start inverter 505. When generate mode speed is reached by PM generator 502, battery 506 is disconnected by opening switches 507a-b, reconfigurable power converter 509 is reconfigured to act as an SAF, and start inverter/active rectifier 505 is reconfigured to act as an active rectifier 505. Voltage on HVDC bus 504 is then brought up to an appropriate level DC load 511, and a power quality monitor may detect that DC power at no-load is within the specification levels. At this point, the DC load 511 is connected to the bus by closing switches 510a-b. Power is then transferred from armature winding 503 of PM generator 502 to active rectifier 505, which powers DC load 511 via to HVDC bus 504 and SAF 509. The SAF portion of buck/boost converter/SAF 509 helps to reduce the necessary size ofthe DC bus capacitor 508 by reducing ripple on HVDC bus 504, without increasing the frequency bandwidth of the active rectifier 505 during generate mode.

Figure 6:
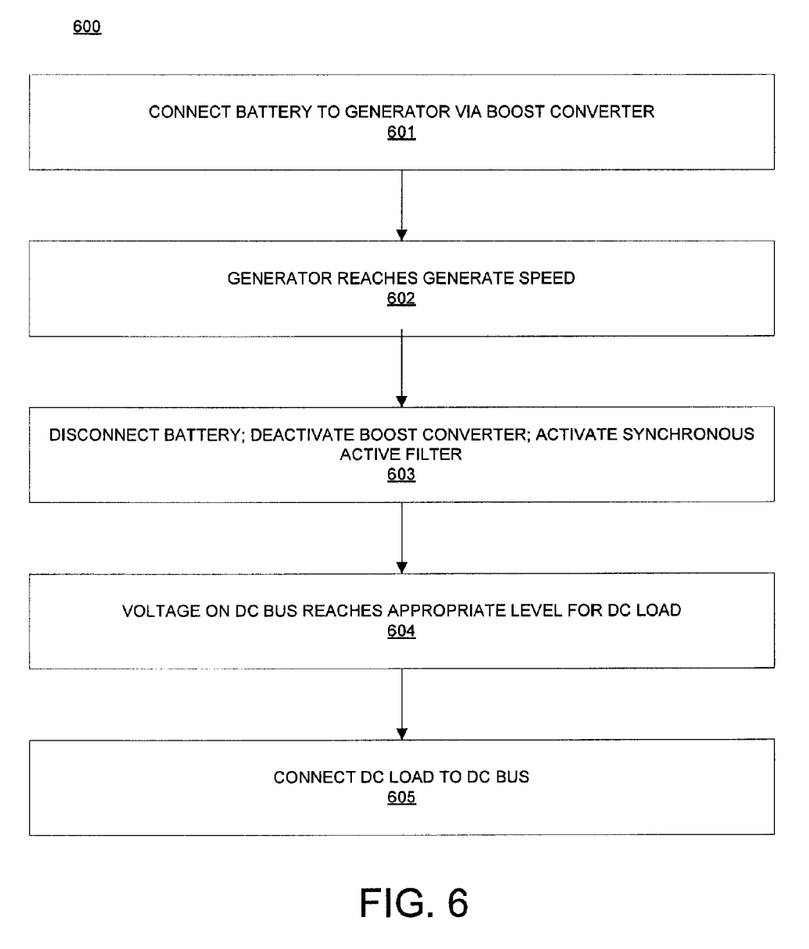
FIG. 6 illustrates an embodiment of a method of operating an EPGS comprising a boost converter and a synchronous active filter.

FIG. 6 illustrates an embodiment of a method 600 of operating an EPGS comprising a boost converter/SAF. Method 600 may be implemented in any of EPGSs 100, 200, 300, or 500. In block 601, a battery is connected to a generator of the EPGS via the boost converter in start mode. In block 602, the generator reaches a predetermined generate speed using the power from the boost converter and battery. In block 603, the battery is disconnected from the boost converter, the boost converter is deactivated, and the SAF is activated. In embodiments in which the boost converter comprises a buck/boost converter (for example, FIG. 3), deactivating the boost converter may comprise operating the buck/boost converter in buck mode. In block 604, the voltage on the HVDC bus reaches an appropriate level for the DC load. In block 605, the DC load is connected to the HVDC bus via the SAF in generate mode. The boost converter functions to increase voltage to power start inverter during startup, and the SAF functions to reduce the ripple that is experienced by the DC load during generate mode.

The technical effects and benefits of exemplary embodiments include reduction of weight and size of DC bus capacitance due to introduction of an SAF that reduces voltage ripple experienced by a DC load connected to an HVDC bus of an EPGS. A reconfigurable power converter, which may be configured as a boost converter or an SAF, allows reduction of power electronic components by utilizing multiple functions via software configuration of a three-phase interleave power converter.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of startup of an electric start electrical power generating system (EPGS), the EPGS comprising a generator configured to power a direct current (DC) load via a DC bus, the method comprising:
   disconnecting the DC load from the DC bus;
   connecting a battery to a boost converter, the boost converter being connected to the generator;
   powering the generator using the battery via the boost converter, wherein powering the generator using the battery via the boost converter further comprises a start inverter connected between the boost converter and the generator;
   when the generator reaches a minimum speed:
      disconnecting the battery from the boost converter;
      deactivating the boost converter;
      activating a synchronous active filter, the synchronous active filter being connected to the DC bus; and
      converting the start inverter into a rectifier when the generator reaches the minimum speed, wherein the rectifier is connected between the generator and the DC bus;
   bringing up a voltage on the DC bus by the generator; and
   when the voltage on the DC bus reaches a predetermined level, connecting the DC load to the DC bus.

2. The method of claim 1, wherein the boost converter and the synchronous active filter comprise a reconfigurable power converter.

3. The method of claim 2, wherein activating the synchronous active filter comprises turning off at least one switch of the reconfigurable power converter.

4. The method of claim 1, wherein converting the start inverter into the rectifier comprises turning off at least one switch of the start inverter.

5. The method of claim 1, wherein the generator comprises a wound field generator, and powering the generator using the battery via the boost converter further comprises an exciter inverter connected between the boost converter and an exciter field winding of the generator.

6. The method of claim 5, further comprising when the generator reaches the minimum speed, converting the exciter inverter to a DC exciter by turning off at least one switch of the exciter inverter and disabling a phase leg of the exciter field winding.

7. The method of claim 6, wherein bringing up a voltage on the DC bus by the generator comprises bringing up the voltage by the exciter field winding and the DC exciter.

8. The method of claim 5, wherein the boost converter comprises a buck/boost converter, the buck/boost converter being connected between the exciter inverter and the DC bus, and wherein deactivating the boost converter comprises operating the buck/boost converter in buck mode.

9. An electrical power generating system (EPGS), comprising:
   a generator connected to a direct current (DC) bus;
   a boost converter connected to the generator;
   a battery, the battery configured to power the generator during startup via the boost converter, wherein when the generator reaches a minimum speed, the battery is configured to be disconnected from the boost converter;

a start inverter connected between the boost converter and the generator wherein the start inverter is configured to be converted into a rectifier when the generator reaches the minimum speed, and wherein the rectifier is connected between the generator and the DC bus; and a synchronous active filter (SAF), the SAF being connected to the DC bus;

wherein when a voltage on the DC bus is brought up to a predetermined level by the generator, the generator is configured to power a DC load, the boost converter is configured to be deactivated, and the SAF is configured to be activated.

10. The EPGS of claim 9, wherein the boost converter and the synchronous active filter comprise a reconfigurable power converter.

11. The EPGS of claim 10, wherein the synchronous active filter is activated by turning off at least one switch of the reconfigurable power converter.

12. The EPGS of claim 9, wherein the start inverter is configured to be converted into the rectifier by turning off at least one switch of the start inverter.

13. The EPGS of claim 9, wherein the generator comprises a wound field generator, and further comprising an exciter inverter connected between the boost converter and an exciter field winding of the generator.

14. The EPGS of claim 13, wherein the exciter inverter is configured to be converted to a DC exciter by turning off one phase leg of the exciter inverter and disabling a phase leg of the exciter field winding when the generator reaches the minimum speed.

15. The EPGS of claim 14, wherein the voltage on the DC bus is brought up to the predetermined level by the exciter field winding and the DC exciter.

16. The EPGS of claim 13, wherein the boost converter comprises a buck/boost converter, the buck/boost converter being connected to the exciter inverter and the DC bus, and wherein the boost converter is configured to be deactivated by operating the buck/boost converter in buck mode.

17. A method of startup of an electric start electrical power generating system (EPGS), the EPGS comprising a generator configured to power a direct current (DC) load via a DC bus, the method comprising:

disconnecting the DC load from the DC bus;

connecting a battery to a boost converter, the boost converter being connected to the generator;

powering the generator using the battery via the boost converter, wherein the generator comprises a wound field generator, and powering the generator using the battery via the boost converter further comprises an exciter inverter connected between the boost converter and an exciter field winding of the generator;

when the generator reaches a minimum speed:
  disconnecting the battery from the boost converter;
  deactivating the boost converter;
  activating a synchronous active filter, the synchronous active filter being connected to the DC bus; and
  converting the exciter inverter to a DC exciter by turning off at least one switch of the exciter inverter and disabling a phase leg of the exciter field winding;

bringing up a voltage on the DC bus by the generator; and when the voltage on the DC bus reaches a predetermined level, connecting the DC load to the DC bus.

\* \* \* \* \*